UNITED STATES PATENT OFFICE 2,057,319

BENZYL-BENZO-THIAZYL SULPHIDE AND METHOD OF MAKING THE SAME

Winfield Scott, Nitro, W. Va., assignor, by mesne assignments, to Monsanto Chemical Company, Wilmington, Del., a corporation of Delaware No Drawing. Application September 18, 1929, Serial No. 393,579

4 Claims. (Cl. 260—44)

The present invention relates to new chemical substances comprising a product obtained by reacting a mercapto aryl thiazole or a metallic salt thereof with a substituted aryl halide and more specifically with an aryl halide containing a substituted nitro group. These products may be conveniently termed substituted aryl-aryl thiazyl sulphides. The invention also comprises the process of manufacturing such products.

One of the preferred new compounds, namely, 4'-nitro-benzyl benzothiazyl sulphide was prepared as follows: Substantially equimolecular proportions of mercaptobenzothiazole and potassium hydroxide were dissolved in ethyl alcohol and to the potassium salt of mercapto benzothiazole thus formed a slight excess more than an equivalent quantity of p-nitro-benzyl bromide dissolved in a solvent comprising alcohol and ether was added slowly with agitation at a temperature preferably below 30° C. After the reaction was completed, the solid potassium bromide that separated out was filtered off and the p-nitrobenzyl benzothiazyl sulphide was precipitated from the alcoholic filtrate by the addition of water thereto. The crude p-nitrobenzyl benzothiazyl sulphide thus precipitated was filtered off, washed with dilute caustic solution, for example with potassium hydroxide solution, to eliminate any unreacted mercapto benzothiazole and water and then purified, preferably by recrystallization from an organic solvent, for example ethyl alcohol. The product thus obtained was a yellow solid, melting at 93.5° C. The reaction involved in the preparation of p-nitrobenzyl benzothiazyl sulphide by the above method is most probably as follows:

benzothiazole and an alkali, for example potassium hydroxide, were dissolved in ethyl alcohol and a slight excess over an equivalent quantity of p-brom benzyl chloride dissolved in ethyl alcohol added thereto with agitation at room temperature. After the reaction was completed, the p-brombenzyl benzothiazyl sulphide which precipitated out was removed by filtration, washed with a dilute caustic solution, for example potassium hydroxide solution, and water to eliminate any unreacted mercaptobenzothiazole and potassium chloride. The crude product was extracted with an organic solvent, for example ether. On evaporating the ether from the ethereal extract, a yellow solid was obtained which, on further purifying, preferably by recrystallizing from an organic solvent, for example ligroin, melted at 80° C.

As another example of the preferred new class of compounds, substantially equimolecular proportions of mercapto benzothiazole and an alkali, for example potassium hydroxide, were dissolved in ethyl alcohol. To the potassium salt of mercapto benzothiazole formed thereby, a slight excess over an equivalent portion of B-chlorethyl p-toluene sulphonate was added thereto with agitation. On completion of the reaction, water was added to the reaction product, thus dissolving the potassium chloride formed by the reaction and separating the crude new compound as an oil. This oil was separated, washed with an alkali, for example potassium hydroxide solution and water and extracted with an organic solvent, for example ether. On evaporating the ether

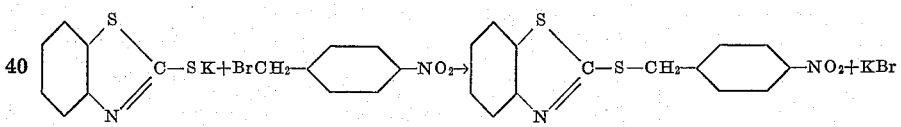

Another example of the preferred class of compounds comprising p-brombenzyl benzothiazyl sulphide was prepared according to the following equation:

from the ethereal extract a solid was obtained which, after washing with an organic solvent for example xylene, melted at 201° C.

The equation wherein this compound known

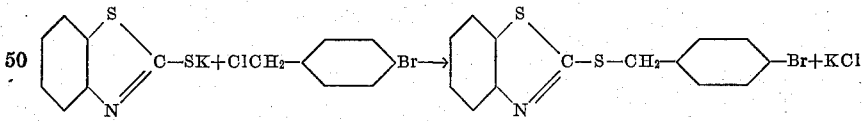

In the preparation of the above product, substantially equimolecular proportions of mercapto as B-thio-ethyl benzothiazyl p-toluene sulphonate was prepared as hereinbefore described follows:

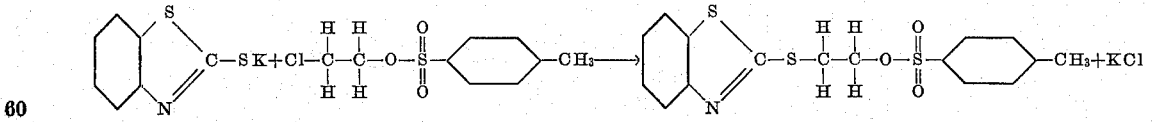

Another of the preferred new class of compounds comprises the reaction product of an alkali mercapto tolylthiazole, for example potassium mercapto tolyl thiazole and p-brom benzyl chloride prepared according to the following equation:

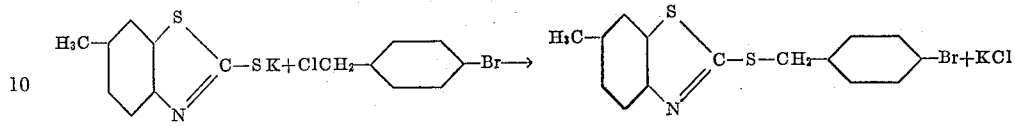

This material, known as p-brombenzyl tolyl thiazyl sulphide was prepared in the following manner: Substantially equimolecular proportions of mercapto tolylthiazole and an alkali, for example potassium hydroxide, were dissolved in ethyl alcohol. To the potassium salt of mercapto tolylthiazole thereby formed, slightly more than an equivalent quantity of p-brom benzyl chloride was added at room temperature. After the reaction was completed the yellow pasty mass formed was washed first with water to eliminate the potassium chloride formed and then with a dilute caustic solution, for example potassium hydroxide to eliminate any unreacted mercapto tolylthiazole. The water and alkali washed product on further purifying, preferably by recrystallization from an organic solvent, for example ligroin, melted at 85° C.

As a further example of the invention, p-nitrobenzyl tolylthiazyl sulphide has been prepared by reacting a mercapto aryl thiazole with a substituted aryl halide or more specifically by reacting a mercapto aryl thiazole with an aryl halide containing a substituted nitro group. Thus, substantially equimolecular proportions of mercapto tolylthiazole and an alkali, for example potassium hydroxide, were dissolved in ethyl alcohol and a substantially equivalent quantity of p-nitro benzyl bromide dissolved in an ether-alcohol solution added thereto with agitation. On completion of the reaction, the solvent was removed from the reaction product as for example by evaporation. The residue was then washed with water and an alkali, for example potassium or ammonium hydroxide solution or both, and further purified, preferably by recrystallization from an organic solvent, for example ethyl alcohol. A crystalline yellow product melting at 100° C. was thus obtained.

The reaction involved in the preparation of p-nitrobenzyl tolylthiazyl sulphide according to the method disclosed above is as follows:

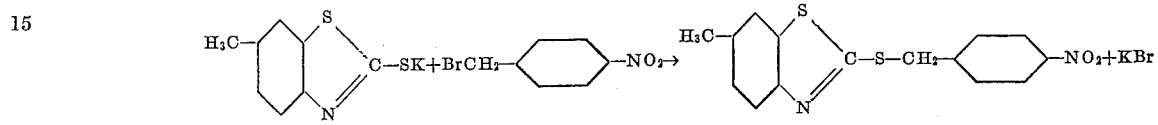

Other substituted aryl-aryl thiazyl sulphides than those hereinbefore set forth may also be conveniently prepared by reacting a mercapto aryl thiazole or a metallic salt thereof, preferably dissolved in a solvent, with a substituted aryl halide and preferably with an aryl halide containing a substituted nitro group. The resulting product, as has been shown by the various examples hereinbefore set forth, comprises compounds containing the group

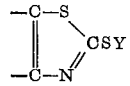

wherein Y represents a substituted aryl and preferably a nitro substituted aryl group.

Having thus described the present invention, what is claimed is:

1. The compound, a nitro substituted benzyl benzothiazyl sulphide.

2. The compound, 4'-nitro benzyl benzothiazyl sulphide.

3. A method of making 4'-nitrobenzyl benzothiazyl sulphide which comprises reacting in the presence of an organic solvent p-nitro benzyl bromide, mercapto benzothiazole and an alkali, separating the 4'-nitrobenzyl benzothiazyl sulphide and purifying by recrystallization.

4. A method of preparing a benzyl-benzothiazyl sulphide which comprises treating a mercaptobenzothiazole with a nitro benzyl halide in the presence of an organic solvent and an alkali, separating said benzyl-benzo-thiazyl sulphide and purifying by recrystallization.

WINFIELD SCOTT.